INVENTORS
R.G. BEARDEN
R.B. KIMBALL
HARRY SCHNEIDER
L.G. SCHWIEGER

BY Hudson & Young
ATTORNEYS

July 17, 1962 R. G. BEARDEN ETAL 3,045,122
PROCESS MONITORING ANALYZER
Filed May 21, 1959 2 Sheets-Sheet 2

INVENTORS
R. G. BEARDEN
R. B. KIMBALL
BY HARRY SCHNEIDER
L. G. SCHWIEGER
Hudson & Young
ATTORNEYS

United States Patent Office 3,045,122
Patented July 17, 1962

3,045,122
PROCESS MONITORING ANALYZER
Robert G. Bearden, Idaho Falls, Idaho, Robert B. Kimball, Canoga Park, Calif., and Harry Schneider and Leander G. Schwieger, Idaho Falls, Idaho, assignors to Phillips Petroleum Company, a corporation of Delaware
Filed May 21, 1959, Ser. No. 814,903
8 Claims. (Cl. 250—218)

This invention relates to the analysis of fluid samples to determine the composition thereof.

A number of optical instruments have been developed in recent years for use in the analysis of fluid streams. Many of these analyzers are based on the fact that various substances absorb radiation at wave-lengths which are characteristic of the substances. The present invention provides an improved analyzer which is based on this principle. Radiation from a suitable source is directed through a sample cell to impinge on a radiation detector. Filters which absorb radiation at wavelengths approximately the same as the wavelengths at which the substance to be detected absorbs radiation and which transmit such wavelengths are positioned in the beam alternately so that the analyzer can be calibrated to compensate for such factors as turbidity, radiation source variations, radiation darkening of windows, and detector sensitivity changes. An electrical network is provided which stores a signal representative of the transmitted radiation when the reference filter is positioned at the radiation beam. This reference signal is combined with the detector output during the analysis cycle to make the necessary compensation.

It is essential in many operations that a signal be provided at all times which represents the composition of the sample stream. In accordance with the present invention, a detector system is provided in conjunction with the analyzer so that a warning signal is emitted any time there is a malfunction in the analyzer. This detecting system is capable of recognizing almost any possible failure within the analyzer or within the detecting system itself.

Accordingly, it is an object of this invention to provide an improved optical analyzer.

A further object is to provide a detecting system for use with an analyzer which senses any malfunction in the analyzer or in the detecting system itself.

A further object is to provide apparatus for detecting decreases of flow through a conduit.

Other objects, advantages and features of the invention should become apparent from the following detailed description, taken in conjunction with the accompanying drawing in which.

Figure 1:
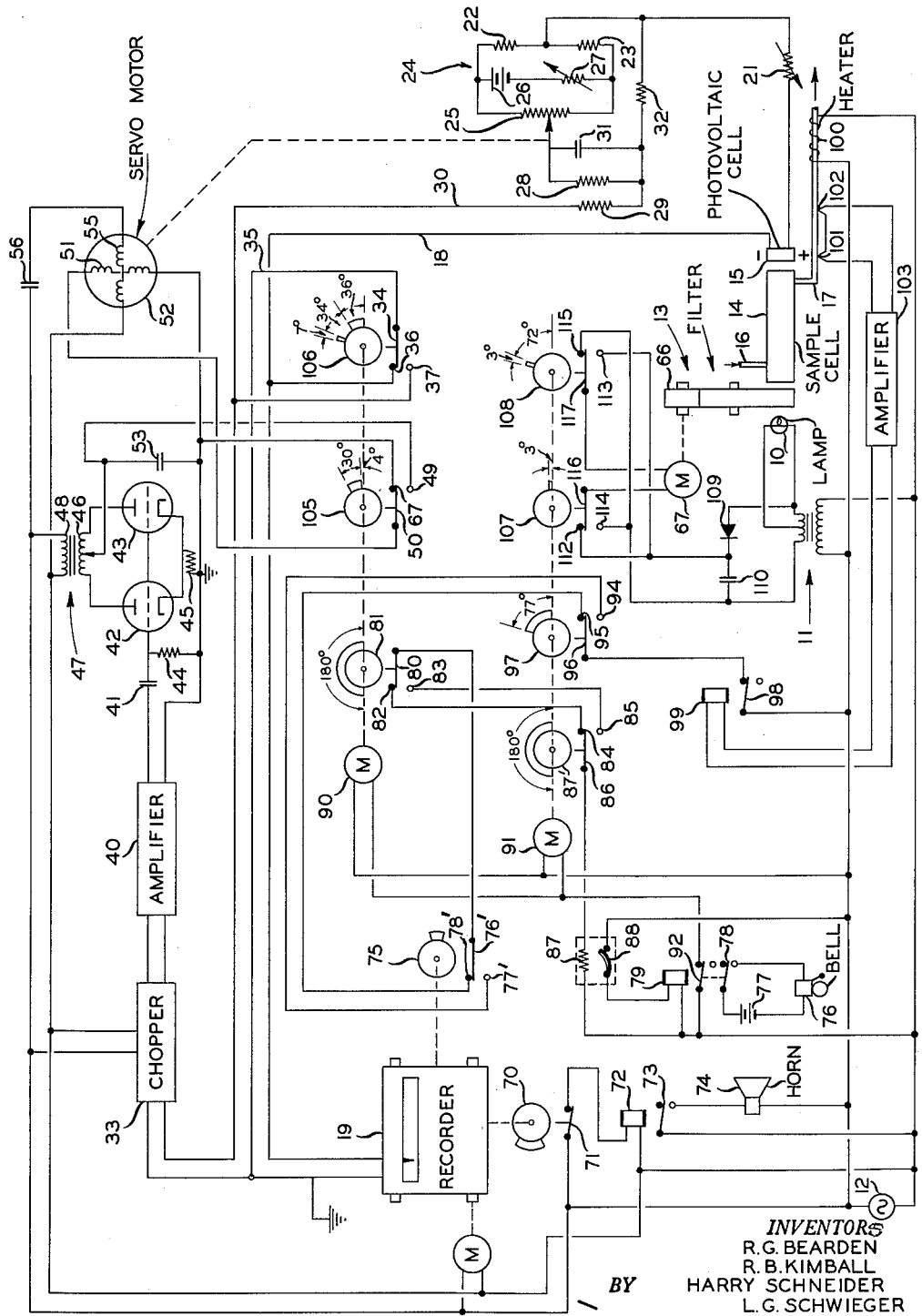
FIGURE 1 is a schematic representation of the optical analyzer and detection system of this invention.

Referring now to the drawing in detail and to FIGURE 1 in particular, there is shown a lamp 10 which emits radiation of suitable wavelengths for use in the analysis of a selected substance. Lamp 10 is energized from the secondary winding of a transformer 11 which is energized from an alternating current source 12. Radiation emitted from lamp 10 is directed through a filter unit 13 and a sample cell 14 to impinge on a photovoltaic cell 15. A fluid stream to be analyzed is introduced into cell 14 through a conduit 16 and is removed through a conduit 17. The first output terminal of cell 15 is connected by a lead 18 to the first terminal of a recorder 19. The second output terminal of cell 15 is connected through a variable resistor 21 to the junction between resistors 22 and 23 of a bridge network 24. A potentiometer 25 forms a second side of the bridge network. A voltage source 26 and and adjustable resistor 27 are connected in series relationship with one another across first opposite terminals of the bridge network. The contactor of potentiometer 25 is connected through resistors 28 and 29 to a lead 30 which is connected to a terminal 37. A switch 34 is connected to a lead 35 which is connected to the second input terminal of recorder 19. Switch 34 is adapted to engage a terminal 36 in a first position and terminal 37 in a second position. Terminal 36 is connected to lead 18. A capacitor 31 is connected in parallel with resistor 28. The junction between resistors 28 and 29 is connected to the junction between resistors 21 and 22 through a resistor 32. Lead 30 is also connected to the first input terminal of a chopper 33. The second input terminal of chopper 33 is connected to the second input terminal of recorder 19. Chopper 33 is energized from alternating current source 12 so as to provide an output signal of the frequency of source 12. The alternating output signal of chopper 33 is representative of the input direct signal applied thereto. This alternating signal is applied to the input terminals of an amplifier 40. The first output terminal of amplifier 40 is connected through a capacitor 41 to the control grids of a pair of triodes 42 and 43. The second output terminal of amplifier 40 is connected to ground. A resistor 44 is connected between the control grids of triodes 42 and 43 and ground, and a resistor 45 is connected between the cathodes of triodes 42 and 43 and ground. The anodes of triodes 42 and 43 are connected to the respective end terminals of a winding 46 of a transformer 47. The second winding 48 of transformer 47 is connected across current source 12. A center tap of transformer winding 46 is connected to a terminal 49 which is adapted to be engaged by a switch 50. Switch 50 is connected to the first terminal of the first winding 51 of a two-phase induction servo motor 52. The second terminal of motor winding 51 is connected to ground. A capacitor 53 is connected between the center tap of transformer winding 46 and ground. The second winding 55 of motor 52 and a capacitor 56 are connected in series relationship with one another across current source 12.

Figure 3:
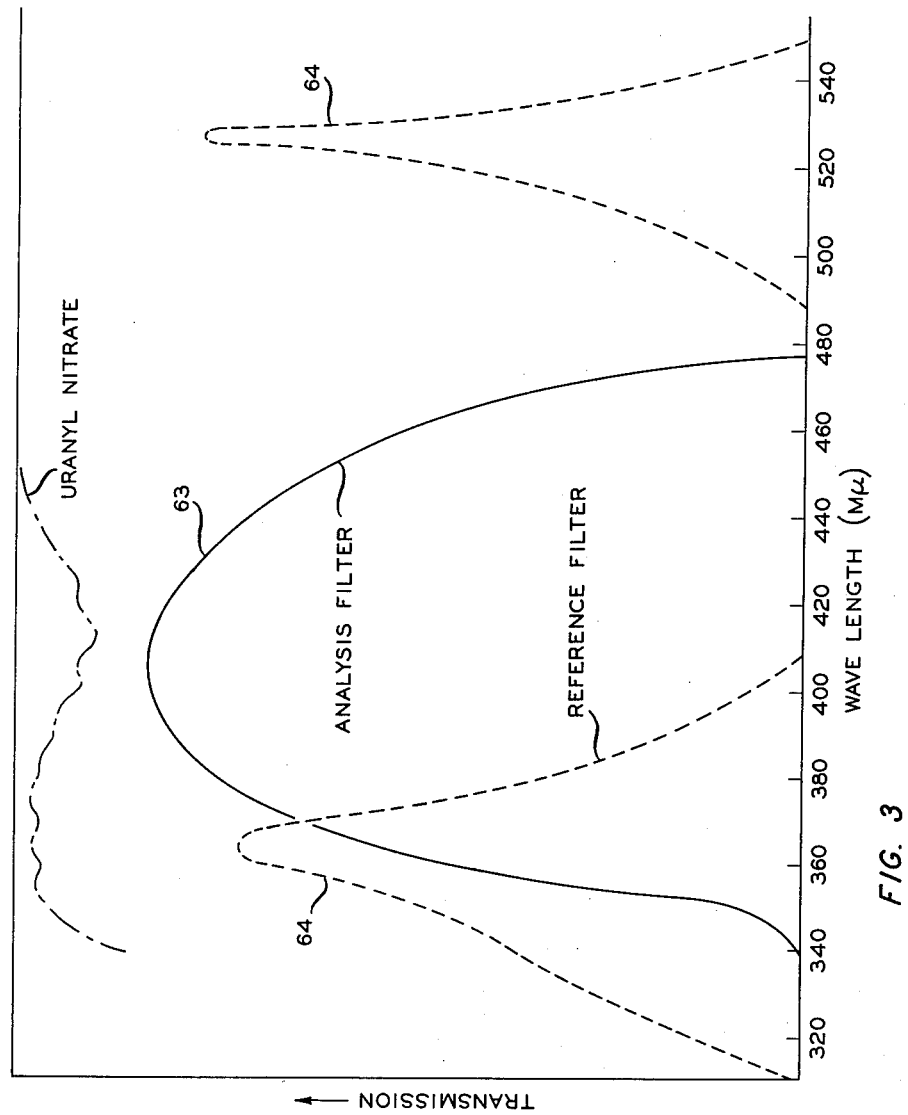
FIGURE 3 is a graphical representation of radiation transmission characteristics of filter materials employed in a specific embodiment of the analyzer.

In order to describe the operation of the optical analyzer of this invention, reference will be made to the analysis of a sample stream containing uranyl nitrate. Uranyl nitrate absorbs radiation in the visible and ultraviolet spectrums at wavelengths illustrated in FIGURE 3. When the analyzer is employed for this purpose, lamp 10 can advantageously be an incandescent thoriated tungsten lamp. During the analysis cycle, it is desirable that filter 13 transmit radiation at wavelengths corresponding to those absorbed by uranyl nitrate. During the reference cycle, it is desirable that wavelengths corresponding to those absorbed by the sample be excluded from the radiation beam. This filtering is accomplished by the apparatus illustrated in FIGURE 2. A rotatable disk 60 is provided with two filter sectors 61 and 62. Filter sector 61 can be a Corning blue filter No. 5113, the transmission properties of which are illustrated by curve 63 in FIGURE 3. Sector 62 can be an interference filter No. 530 of Farrand Optical Co., the transmission characteristics of which are illustrated by curve 64 of FIGURE 3. Sectors 61 and 62 are alternately rotated into the radiation beam by means of a gear 66 which is rotated by a reversible motor 67 of FIGURE 1.

The analyzer of this invention is based upon Beer's Law which states that if the absorbing medium is a substance in solution, the attenuation of light travelling through such a solution depends upon the concentration of the solution. This attenuation of lights can be expressed:

$$kcx = \log \frac{I_0}{I_x} \text{ or } kcx = \log I_0 - \log I_x \quad (1)$$

where $I_0$ = initial or reference light intensity
$I_x$ = light intensity after passing through the sample
$x$ = sample path length
$c$ = concentration of sample
$k$ = extinction coefficient Detector 15 is a photovoltaic cell because such a cell provides a potential output E which is a logarithmic function of the light intensity received when such a cell is connected into a circuit so that the cell has a high external load resistance. Equation 1 can thus be modified as follows:

$$kcx = E_0 - E_x$$

where $E_0$ is proportional to $\log I_0$
$E_x$ is proportional to $\log I_x$

Thus, the output signal is a linear function of the concentration of the substance to be detected in sample cell 14.

The potentiometer-bridge network associated with photovoltaic cell 15 serves to store the output signal of the cell when sector 62 is in the light beam and to apply a continuous reference signal to be subtracted from the cell output when sector 61 is in the light beam. Variable resistor 21 has an impedance of the order of one megohm so as to provide the high external load impedance for the output of cell 15. During the reference cycle, cell 15 and the bridge network are connected in parallel with one another by having switch 34 engage terminal 37. Any current which flows through chopper 33 to amplifier 40 results in an output signal of the amplifier which drives servo motor 52, assuming switch 50 is in engagement with terminal 49. Motor 52 adjusts potentiometer 25 until the input signal to the servo unit is reduced to zero. During the analysis cycle, switch 34 is moved into contact with terminal 36. This effectively removes the servo unit from the output of cell 15. Switch 50 is moved into engagement with a grounded terminal 67 at this time to short motor 52. The output signal of cell 15 is reduced in magnitude by the output signal from the bridge network, and the resulting signal is applied to the input of recorder 19. Filter sectors 61 and 62 are selected so that the total transmitted radiation is approximately the same during the two cycles, with no uranyl nitrate in cell 14.

In the specific example described, the analyzer provides a record of the composition of the sample circulated through cell 14. If the concentration of uranyl nitrate exceeds a predetermined value, it is desirable to have a warning of this condition. The marking pen of recorder 19 is connected by a mechanical linkage to a cam 70 to rotate the cam adjacent a switch 71. When cam 70 is rotated a predetermined amount, which is representative of a predetermined concentration of uranyl nitrate in the sample stream, switch 71 is opened. The coil of a relay 72 is connected in series with switch 71 across current source 12. The coil of relay 72 normally is energized when the concentration of uranyl nitrate does not exceed the preselected value. Relay 72 actuates a switch 73 which is connected in series with a horn 74 across current source 12. As long as the coil of relay 72 is energized, switch 73 is open so that horn 74 is not energized. If the uranyl nitrate concentration exceeds the preselected value, switch 73 closes to energize horn 74 to provide an audible warning.

As previously mentioned, it is desirable that safety apparatus be associated with the analyzer to detect malfunctions of any of the analyzer components. This safety mechanism includes a bell 76 which is connected in circuit with a battery 77 by a switch 78 which remains open as long as the coil of a relay 79 is energized. If the coil of relay 79 becomes deenergized, switch 78 is closed to energize bell 76. The bell is energized by battery 77 which is independent of current source 12 so that a failure of the current source will result in a ringing of the bell.

In addition to the reference cycle and the analysis cycle previously described, a third check cycle is provided as a part of the failure alarm system. During the check cycle, which follows the reference cycle, the output of bridge 24 is compared with the output of cell 15 with the reference filter in the radiation beam and the error signal applied to recorder 19. If the analyzer is operating correctly, a zero reading should be applied to the recorder at this time. A second cam 75 is mechanically connected to the pen arm of recorder 19 in such a manner that a switch 76' is moved into contact with a terminal 77' when the recorder reads zero. At other times, switch 76' engages a terminal 78'. Switch 76' is connected to a switch 80 which is actuated by a cam 81 to engage either a terminal 82 or a terminal 83. Terminals 82 and 83 are connected to respective terminals 84 and 85 which are adapted to be engaged selectively by a switch 86 that is actuated by a cam 87'. Switch 86 is connected through a heater 87 to one terminal of current source 12. The coil of relay 79 is connected across current source 12 through a thermal switch 88 which is open a predetermined time interval after current is applied to heater 87. Thermal switch 88 can be a bimetallic element. Cams 81 and 87' are rotated by respective timing motors 90 and 91 which are connected across current source 12 through a switch 92 which remains closed as long as the coil of relay 79 is energized. Cams 81 and 87' have the same configuration and rotate simultaneously as long as the two timing motors operate correctly. As will become apparent hereinafter, this provides a check on the operation of the timing system because the alarm will sound any time cams 81 and 87' are not rotated together.

Terminals 77' and 78' are connected to respective terminals 94 and 95 which are adapted to be engaged selectively by a switch 96 that is actuated by a cam 97. Switch 96 is connected to the second terminal of current source 12 through a switch 98 which normally is closed when a relay coil 99 is energized. When the cams 81 and 87' occupy the positions illustrated, current flows through heater 87 so that switch 88 remains closed and the coil of relay 79 is energized. During the check cycle, cam 97 rotates clockwise so that switch 96 engages terminal 94. At this same time, cam 75 pushes switch 76' into engagement with terminal 77' if the recorder reading is zero. If not, the circuit through heater 87 is broken to energize bell 76. If cams 81 and 87' do not occupy the same relative positions during the check cycle, the circuit through heater 87 is broken. Failure of the individual switches can be detected at this time because of the dual switch system employed.

A failure of light source 10 or an empty sample cell is detected because a balanced condition can not be obtained and an error signal is applied to recorder 19 so that cam 75 does not engage switch 76'. When the instrument proceeds to the analysis cycle, switches 76' and 96 engage respective terminals 78' and 95 so that heater 87 remains energized. The two filters forming sectors 61 and 62 are adjusted in thickness so as to produce signals of slightly different magnitudes. Thus, the recorder remains at the zero position if the filter change does not occur when the analyzer moves to the analysis cycle. Cam 75 keeps switch 76' in engagement with terminal 77' if this occurs so that the circuit path through heater 87 is broken. This provides a check on the operation of the rotatable filter unit. The same situation occurs if there is a failure of photoelectric cell 15.

The sample cell is designed so that a failure of the sample circulating system results in drainage of fluid from the cell. As previously mentioned, an empty cell is detected by the alarm system. It is conceivable, however, that the cell drain conduit 17 could become plugged so that cell drainage could not occur. This situation is detected by the apparatus associated with drain conduit 17. A heating coil 10 surrounds conduit 17 and is energized from current source 12. Thermocouples 101 and 102 are connected to conduit 17 in spaced relationship upstream from heater 100. These two thermocouples are connected in opposition to one another to the input of an amplifier 103. The output signal of amplifier 103 is applied to the coil of relay 99. During normal operation, the flow of sample through conduit 17 carries heat away from the heating coil. Thermocouple 102 normally senses a temperature which is somewhat higher than the temperature sensed by thermocouple 101, and the resulting signal is applied to amplifier 103 so as to tend to prevent conduction thereof. However, amplifier 103 is biased to conduct under this condition so that the coil of relay 99 is energized when such a differential temperature is measured by the two thermocouples. If conduit 17 should become plugged, heat from coil 100 is no longer carried away by the flowing fluid so that the temperature sensed by thermocouple 102 increases rapidly. This overcomes the bias on the amplifier so that a signal is applied to deenergize the coil of relay 99. Switch 98 is opened if relay 99 is deenergized so that heater 87 becomes deenergized to ring bell 76.

Figure 2:
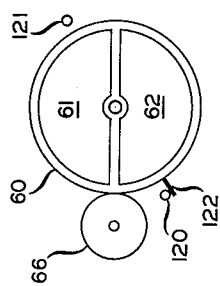
FIGURE 2 illustrates the rotatable filter employed in the analyzer of FIGURE 1.

Cams 105 and 106 are rotated by timing motor 90 to actuate respective switches 50 and 34 to perform the switching operations previously described. Cams 97, 107 and 108 are rotated by timing motor 91 along with cam 87'. Cams 107 and 108 control the operation of motor 67 which rotates filter 13. A rectifier 109 and a capacitor 110 are connected in series relationship with one another across the secondary winding of transformer 11. The junction between rectifier 109 and capacitor 110 is connected to terminals 112 and 113. The junction between capacitor 110 and the secondary winding of transformer 11 is connected to terminals 114 and 115. A switch 116, which is actuated by cam 107, engages terminals 112 and 114 selectively. A switch 117 which is actuated by cam 108, engages terminals 113 and 115 selectively. Switches 116 and 117 are connected to the respective input terminals of motor 67. It should thus be evident that motor 67 rotates in a first direction when 107 moves switch 116 into engagement with terminal 114. Motor 67 is moved in the opposite direction when cam 108 moves switch 117 into engagement with terminal 113. Two stops 120 and 121, see FIGURE 2 are positioned approximately 180° apart so that a projection 122 on disk 60 limits rotation of the disk so that one or the other of the sectors is in the radiation beam.

In one specific operation of the analyzer of this invention, the projections on the timing cams were of the configuration illustrated in FIGURE 1. Timing motors 90 and 91 were selected so that the cams made one complete revolution in approximately 8 minutes. The analyzer is at the beginning of the reference cycle when the cams are in the positions illustrated in the drawing. The reference cycle occupies approximately 35 degrees of the complete cycle of rotation, the cams rotating clockwise. The check cycle continues until the cams have rotated approximately 75 degrees. The actual analysis cycle occurs during the remainder of the cycle of cam rotation.

In view of the foregoing description, it should be evident that a novel analyzer is provided by this invention which is useful in detecting the concentration of a constituent or constituents in a fluid sample. While the analyzer has been described in conjunction with the analysis of uranyl nitrate, it should be evident that other materials can be analyzed by the proper selection of filters. The wavelength of radiation employed and the transmission characteristics of the filters depend on the region in the electromagnetic spectrum at which the sample absorbs radiation. It should also be evident that a novel detection circuit has been provided which checks both the operation of the analyzer and the detecting circuit itself.

While the invention has been described in conjunction with a present preferred embodiment, it should be evident that it is not limited thereto.

What is claimed is:

1. Analysis apparatus comprising a radiation detector to establish a signal representative of radiation impinging thereon, a cell adapted to hold a sample to be analyzed, means to direct a beam of radiation through said cell to impinge on said detector, signal storage means, signal indicating means, first filter means to absorb radiation of wavelengths characteristic of radiation absorbed by the sample to be analyzed, second filter means to transmit an amount of radiation substantially equal to the amount of radiation transmitted by said first filter means but at wavelengths not absorbed by the sample to be analyzed, means to position said second filter means in said beam and to transmit the signal from said detector to said storage means when said second filter means is in said beam, and means to position said first filter means in said beam and to combine signals from said detector and said storage means and transmit the combined signal to said indicating means when said first filter means is in said beam.

2. Analysis apparatus comprising a radiation detector to establish a signal representative of radiation impinging thereon, a cell adapted to hold a sample to be analyzed, means to direct a beam of radiation through said cell to impinge on said detector, signal storage means, signal indicating means, first filter means to absorb radiation of wavelengths characteristic of radiation absorbed by the sample to be analyzed, second filter means to transmit an amount of radiation substantially equal to the amount of radiation transmitted by said first filter means but at wavelengths not absorbed by the sample to be analyzed, timing means to position said first and second filter means in said beam alternately, and means responsive to said timing means to transmit the signal from said detector to said storage means when said second filter means is in said beam and to combine signals from said detector and said storage means and to transmit the combined signal to said indicating means when said first filter means is in said beam.

3. The analyzer of claim 2 wherein said detector is a photovoltaic cell having a large load impedance connected thereto, and said signal storage means comprises a self-balancing bridge network to establish a voltage representative of the output of said detector.

4. The analyzer of claim 2 further comprising first conduit means communicating with said sample cell to introduce a fluid sample, second conduit means communicating with said sample cell to remove fluid therefrom, an alarm, flow detecting means associated with said second conduit means, and means responsive to said flow detecting means to actuate said alarm in the absence of flow through said second conduit means.

5. Analysis apparatus comprising a photovoltaic cell, a sample cell, means to direct a beam of radiation through said sample cell to impinge on said photovoltaic cell, first filter means to absorb radiation of wavelengths characteristic of radiation absorbed by the sample to be detected, second filter means to transmit an amount of radiation substantially equal to the amount of radiation transmitted by said first filter means but at wavelengths not absorbed the sample to be detected, timing means to position said first and second filter means in said beam alternately, a recorder, a bridge network, a servo motor connected to said bridge network, a load impedance, means responsive to said timing means to apply the output signal of said photovoltaic cell through said load impedance to the input of said servo motor in opposition to the signal across said bridge network, when said second filter means is in said beam, whereby said servo motor adjusts said bridge network to establish a condition of balance, and means responsive to said timing means to apply the output signal of said photovoltaic cell through said load impedance to said recorder in opposition to the signal across said bridge network when said first filter means is in said beam.

6. Analysis apparatus comprising a radiation detector to establish a signal representative of radiation impinging thereon, a cell adapted to hold a sample to be analyzed, means to direct a beam of radiation through said cell to impinge on said detector, signal storage means, signal indictating means, first filter means to absorb radiation of wavelengths characteristic of radiation absorbed by the sample to be analyzed, second filter means to transmit an amount of radiation substantially equal to the amount of radiation transmitted by said first filter means but at wavelengths not absorbed by the sample to be analyzed, timing means to position said first and second filter means in said beam alternately, means responsive to said timing means to transmit the signal from said detector to said storage means when said second filter is in said beam, and thereafter to combine the stored signal with the output signal of said detector, said signals being combined so that the resulting signal normally is zero, an alarm, means responsive to said resulting signal to actuate said alarm when said resulting signal is not substantially zero, and means responsive to said timing means to combine signals from said detector and said storage means and to transmit the combined signal to said indicating means when said first filter means is in said beam.

7. The apparatus of claim 6 wherein said resulting signal is applied to said indicating means, and said means responsive to said resulting signal comprises means responsive to said indicating means.

8. The apparatus of claim 6 wherein said means responsive to said resulting signal includes first and second timing motors, means to rotate said motors together, first and second cam-operated switches adapted to be actuated simultaneously by rotation of said first and second motors, respectively, and circuit means connected through said first and second switches to actuate said alarm.

References Cited in the file of this patent

UNITED STATES PATENTS

| | | |
|---|---|---|
| 2,244,362 | Hartig | June 3, 1941 |
| 2,451,465 | Barney | Oct. 19, 1948 |
| 2,501,599 | Eltenton et al. | Mar. 21, 1950 |
| 2,543,588 | Nelson | Feb. 27, 1951 |
| 2,658,141 | Kurland et al. | Nov. 3, 1953 |
| 2,722,156 | Warren | Nov. 1, 1955 |
| 2,764,692 | Miller | Sept. 25, 1956 |
| 2,804,549 | Warren | Aug. 27, 1957 |
| 2,828,479 | Jackson | Mar. 25, 1958 |
| 2,864,278 | Sparks | Dec. 16, 1958 |